(12) United States Patent
Turner

(10) Patent No.: US 7,260,861 B2
(45) Date of Patent: Aug. 28, 2007

(54) PALLET-RAMP COUPLING APPARATUS AND METHOD

(75) Inventor: Christopher Michael Turner, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 245 days.

(21) Appl. No.: 11/007,615

(22) Filed: Dec. 8, 2004

(65) Prior Publication Data

US 2006/0117503 A1    Jun. 8, 2006

(51) Int. Cl.
*E01D 1/00* (2006.01)
(52) U.S. Cl. .................. 14/69.5; 403/292; 403/353
(58) Field of Classification Search ............ 403/363, 403/289, 292, 294, 333, 341, 353, 355; 14/69.5
See application file for complete search history.

(56) References Cited

U.S. PATENT DOCUMENTS

| | | | |
|---|---|---|---|
| 4,367,979 A * | 1/1983 | Milligan ................ 405/70 |
| 5,505,140 A | 4/1996 | Wittmann ............... 108/51.1 |
| 5,827,006 A * | 10/1998 | Hoshino .................. 403/340 |
| 5,911,179 A | 6/1999 | Spiczka .................. 108/51.11 |
| 6,261,064 B1 * | 7/2001 | Tang ..................... 416/210 R |
| 6,354,759 B1 * | 3/2002 | Leicht ..................... 403/403 |
| 6,389,629 B1 * | 5/2002 | Schouest .................. 14/69.5 |
| 7,104,524 B1 * | 9/2006 | Hidding et al. ............ 254/88 |

* cited by examiner

*Primary Examiner*—Gary S. Hartmann
(74) *Attorney, Agent, or Firm*—Kunzler & Associates

(57) ABSTRACT

An apparatus, system, and method are disclosed for integrating the steps of securing and aligning a ramp to the pallet. A pallet mounting bracket secures to a pallet and mates with a corresponding ramp mounting bracket secured to a ramp. A pallet mounting bracket includes a registration receptacle that receives a registration member secured to the ramp mounting bracket in order to position the ramp with respect to the pallet. A driving member secured to the pallet mounting bracket engages a corresponding engagement portion on the ramp mounting bracket as the ramp is lowered into place next to the pallet. The driving member urges the engagement portion toward the pallet thereby urging a fastener secured to the ramp mounting bracket into engagement with a locking portion secured to the pallet mounting bracket thereby locking the ramp into position in alignment with the pallet.

10 Claims, 5 Drawing Sheets

PALLET-RAMP COUPLING APPARATUS AND METHOD

BACKGROUND OF THE INVENTION

1. Field of the Invention

This invention relates generally to an apparatus, system, and method for unloading pallets and more particularly to an apparatus, system, and method for coupling unloading ramps to pallets.

2. Description of the Related Art

Wooden and plastic pallets are ubiquitous in the shipping industry. Nearly every shipment of bulky items comes attached to a pallet. Typically the pallet provides a standard interface for forklift blades when lifting the cargo and pallet for transport. Pallets provide an additional benefit of having a standardized size, enabling goods loaded on pallets to be packed tightly together during shipping.

Because pallets typically must provide some room for insertion of forklift blades, the upper surface of the pallet may be as much as seven inches above the ground. When the pallet and its cargo arrive at a final destination, the recipient must typically find some means to move the cargo the seven inches from the top of the pallet to the ground. Such an operation can be very problematic for bulky, delicate items such as large computer systems, of which pre-configured server racks are a common example. In a typical scenario, the end recipient of a computer system is not in the shipping business and will not have the know-how or equipment to easily unload the computer system from the pallet. Given the great weight of computer systems, the recipient may risk injury or damage to the cargo by unloading the cargo improperly.

One solution to this problem is to ship unloading ramps with the cargo and pallet. Such ramps may be mountable to the pallet to ease the movement of the cargo from the pallet to the ground. However, unloading ramps present some additional difficulties. For example, if the ramp is not properly secured to the pallet, it may shift while the cargo is unloading, with potentially disastrous results. If the top of the ramp is not aligned with the top of the pallet, the cargo may experience a ruinous jolt when it falls from the pallet onto the ramp. Alternatively, if the ramp is higher than the top of the pallet, the cargo may tend to catch on the ramp and tip as it is pushed off the pallet or push the ramp away from the pallet altogether.

Prior attempts to bundle ramps with a pallet and cargo have a number of deficiencies. Some fail to provide any mechanisms for securing the ramp to the pallet. Those attempts that secure the ramps to the pallet require user intervention to secure the ramps to the pallet. That is, the user must both position the ramp and take steps to secure the ramp to the pallet. Requiring users to take additional steps to secure the ramp to the pallet is problematic for two reasons.

First, due to the inexperience of the typical user, a user who is unloading cargo may not realize that additional steps are needed to secure a ramp. Therefore, a user may not be prompted to, for example, find a fastener among the packaging of a computer system and may neglect to use the fastener to secure the ramp.

Secondly, in order for a user to secure a ramp to a pallet using a fastener, such as a bolt, the ramp and pallet must be precisely sized. For example, to secure the ramp to the pallet with a bolt, an aperture on the ramp must typically be aligned with an aperture on the pallet in order to insert the bolt there through. This requirement for alignment imposes excessive requirements for dimensional precision. Pallets and ramps are typically made very inexpensively out of rough-cut boards subject to very loose tolerance in both their size and position when assembled. Requiring precise measurements when placing holes to receive bolts increases the cost of an otherwise simple article.

In addition, pallets are subject to rough handling and moisture during shipping, both of which can affect the shape and size of the pallet. The weight of cargo may deform the pallet or crush portions of the pallet. Moisture causes wood to swell and distort. This deformation of the pallet during shipment makes aligning the ramp and pallet for securement with traditional fasteners even more difficult. Even where a fastener is usable to fasten the ramp to the pallet, distortion of the pallet may cause the upper surface of the ramp to be misaligned with respect to the upper surface of the pallet, leading to difficulties in unloading.

From the foregoing discussion, it should be apparent that a need exists for an apparatus, system, and method that can securely attach a ramp to a pallet without the need for a separate fastener. Such a device should integrate the steps of positioning the ramp and securing the ramp to the pallet to accommodate inexperienced users. Beneficially, such an apparatus would align the upper surface of the ramp with the upper surface of the pallet without the need for precise construction of the pallet and without regard to distortion of the pallet.

SUMMARY OF THE INVENTION

The present invention has been developed in response to the present state of the art, and in particular, in response to the problems and needs in the art that have not yet been fully solved by currently available pallet ramps. Accordingly, the present invention has been developed to provide an apparatus, system, and method for integrating the steps of securing an unloading ramp to a pallet and aligning the ramp to the pallet, thereby overcoming many or all of the above-discussed shortcomings in the art. It will be noted that the invention provides an apparatus, system, and method for aligning and securing a first surface or structure with respect to a second surface or structure.

A first surface may comprise a relatively flat surface such as a platform or floor. The second surface may comprise an inclined surface such as a ramp or plank. Of course the first and second surfaces may have the same slope. Typically, the first surface comprises an upper surface of a pallet and the second surface comprises an under surface of a ramp. Such an apparatus, system and method may be used with other types of ramps or with other applications requiring such functionality.

The apparatus for securing a pallet to a ramp is provided with a pallet for facilitating the transport of cargo and an unloading ramp for aiding in unloading the cargo from the pallet. The apparatus, in one embodiment, is configured to substantially simultaneously secure the ramp to the pallet during unloading and align the ramp with respect to the pallet.

In one embodiment, a fastener secures to the ramp and is positionable within a locking receptacle secured to the pallet. An engagement portion secures to the ramp and is positioned to engage a driver secured to the pallet. As the engagement portion is brought into engagement with the driver, the driver urges the engagement portion, and thus the ramp, to an operable position wherein the fastener is engaged with the locking receptacle. When engaged with the locking receptacle, the fastener is typically restrained against movement in the vertical direction.

Some embodiments may include a registration member secured to the ramp and a registration receptacle secured to the pallet. The registration member may be inserted into the registration receptacle to position the ramp during engagement of the driver with the engagement portion. Registering the ramp may ensure that the engagement portion is positioned proximate the driver and that the fastener is positioned proximate the locking receptacle.

In one embodiment, the driver, locking receptacle, and registration receptacle are all formed as part of a pallet mounting bracket secured to the upper surface of the pallet. In a like manner, the engagement portion, fastener, and registration member may all be formed as part of a ramp mounting bracket secured to a lower surface of the ramp.

A driver and engagement portion may be embodied as angled portions of the pallet mounting bracket and ramp mounting bracket, respectively. As the angled portions are pushed downwardly against each other, a resulting longitudinal force urges the engagement portion longitudinally, thereby forcing the fastener into the locking receptacle.

A fastener may be embodied as a portion of a tab extending from the ramp mounting bracket. The locking receptacle may be a receptacle formed in the pallet mounting bracket and positioned to receive insertion of the tab and restrain the tab vertically.

A registration member may be embodied as a portion of the tab that inserts into a portion of the aperture sized to receive it. For example, a tab may include a wide portion and a narrow portion forming downwardly-extending, upside-down "T." The registration member may be considered to be the horizontal line of the T and the fastener may be considered to be the under side of the horizontal line.

The aperture may likewise include a wide portion and a narrow portion, forming a horizontal T, with the wide portion closest to the edge of the pallet. The registration receptacle may be considered to be the wide portion of the aperture and the locking receptacle may be considered to be the narrow portion of the aperture To register the ramp with respect to the pallet, the tab is inserted into the wide portion of the aperture. The ramp may then be lowered to engage the engagement portion with the driver. As the driver urges the engagement member longitudinally, the tab is urged into the narrow portion of the aperture. The wide portion of the tab is then restrained against vertical movement, inasmuch as it cannot pass through the narrow portion of the aperture A method for using the foregoing apparatus may include registering the ramp with respect to the pallet, transitioning the ramp, engaging the engagement portion with the driver, and engaging the fastener with the locking receptacle. Registering the ramp may include inserting the registration member into the registration receptacle. Transitioning the ramp may include moving the ramp downwardly, moving the engagement portion toward the driver. Engaging an engagement portion with the driver may include lowering the ramp to cause the engagement portion to press against the driver, creating a resulting longitudinal force on the ramp. Engaging the fastener with the locking receptacle may include inserting the fastener into the locking receptacle such that the fastener is restrained against vertical movement.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

Figure 1:
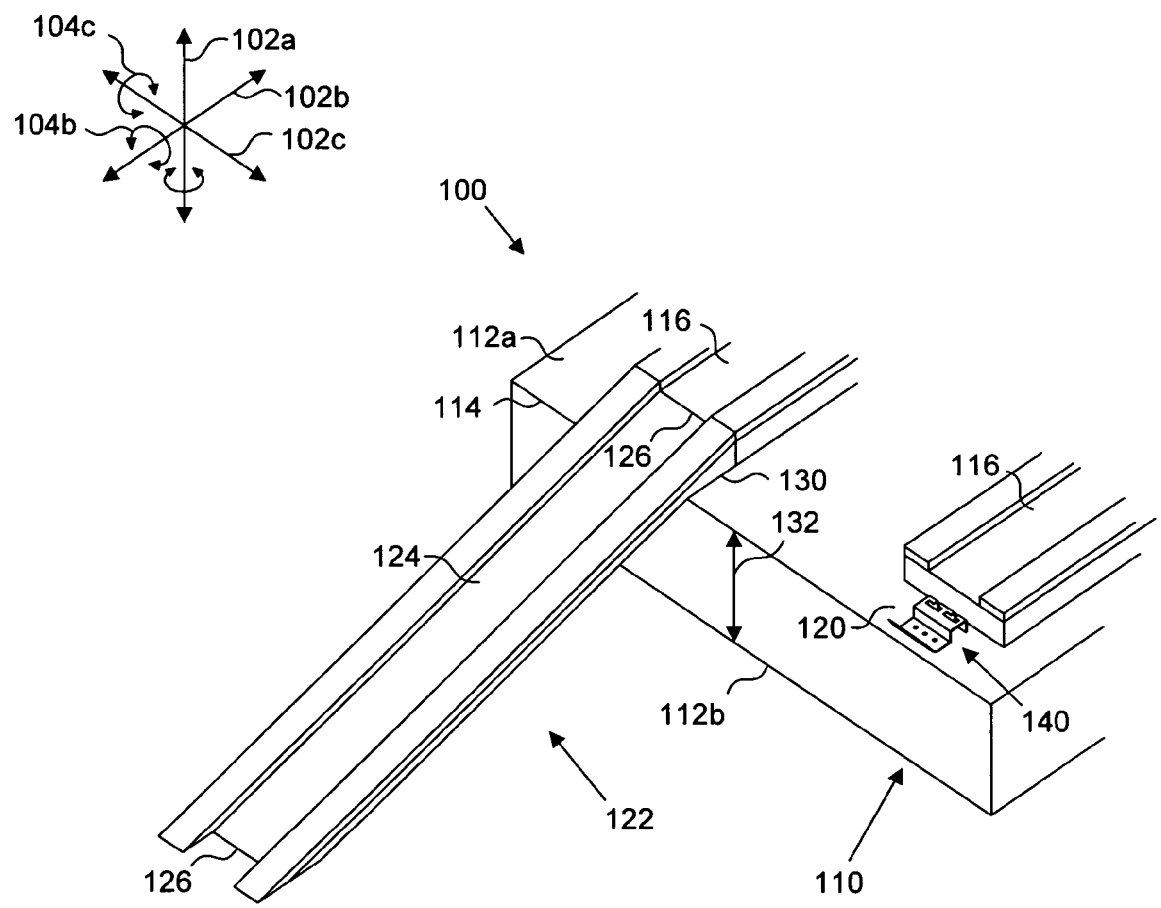
FIG. 1 is perspective view of a pallet, ramp, and pallet mounting bracket, in accordance with the present invention.

Referring to FIG. 1, an apparatus 100 for loading or unloading cargo may define translational directions 102a-102c and rotational directions 104a-104c defined with respect to a pallet 110. Transverse direction 102a may be substantially normal to the upper surface 112a of the pallet 110. Longitudinal direction 102b may be defined as parallel to the upper surface 112a of the pallet 110 and correspond to the direction of travel of cargo as the cargo is unloaded. A lateral direction 102c may be defined as being perpendicular to both the transverse direction 102a and longitudinal direction 102b. Rotational directions 104a-104c are defined as rotation about axes parallel to the translational directions 102a-102c, respectively.

A pallet 110 may include an upper surface 112a for supporting cargo and a lower surface 112b spaced apart in transverse direction 102a from the upper surface 112a. The upper surface 112a may define a loading edge 114 defined as the edge of the pallet 110 proximate to which a ramp will secure. In some embodiments, the pallet 110 may include one or more channels 116 extending in longitudinal direction 102b. A channel 116 may secure portions of the cargo against movement in lateral direction 102c during shipping and unloading. In certain embodiments, a shelf 120, cut out 120, or other formation 120, may be formed at one end of the channel 116 to mate with a corresponding structure on a ramp.

A ramp 122, or ramps 122 may be attached to the pallet 110 prior to unloading cargo. In applications where a ramp is used to load cargo onto a pallet 110, the ramp 122 may secure to the pallet 110 prior to loading of the cargo. A ramp 122 may have a channel 124 formed thereon and positioned to mate with the channel 116 of the pallet 110 to provide a continuous guide from the pallet to a supporting surface, such as the floor of a building. In typical embodiments, an upper edge 126 of the ramp 122 will be aligned in transverse direction 102a with the channel 124 to prevent unloaded cargo from falling from the channel 116 to the channel 124. The channel 124 will typically extend from the upper edge 126 to a lower edge 128 resting on or near a support surface when the ramp is fully secured to the pallet 110. It will be noted that for embodiments of the apparatus 100 that do not include channels 116 or 124, an upper surface of the ramp 122 may simply be aligned with the upper surface 112a of the pallet 100.

A ramp 122 may include a portion 130 of the ramp 122, cutout 130, or like formation matable with the shelf 120 formed on the pallet 110. The portion 130 may support the upper edge 126 and facilitate alignment of the channels 116, 124.

A pallet mounting bracket 140 may be secured to the upper surface 112a of the pallet 110 near the unloading edge 114. The bracket 140 may engage a corresponding bracket (discussed in more detail below) secured to the ramp 122. A pallet mounting bracket 140 may perform the functions of securing and aligning the ramp 122 to the pallet 110. A benefit of the bracket 140 is that it is a separate member that is simply fastened to the pallet 110 by standard fasteners. The pallet 110 may still be made of wood cut to loose tolerances, and only the bracket 140 and its position require greater precision. The bracket 140 may be made of stamped sheet steel, or like material, having similar strength and manufacturability. Alternatively, the bracket 140 may be integrally formed with the upper surface 112a of the pallet 110.

Figure 2:
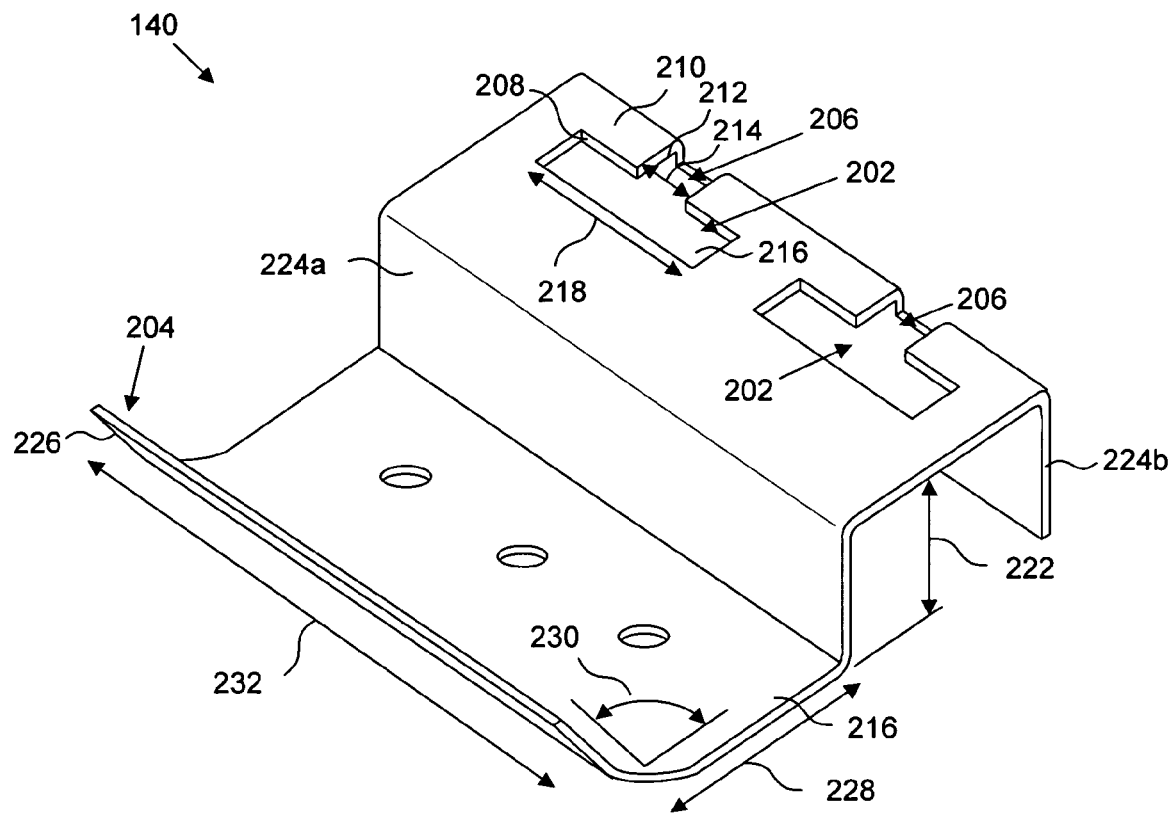
FIG. 2 is an upper perspective view of a pallet mounting bracket having a registration receptacle, locking portion, and driving member, in accordance with the present invention.

Referring to FIG. 2, a pallet mounting bracket 140 may include a registration receptacle 202, a driving member 204, and a locking receptacle 206 for engaging structures on the ramp 122 to secure and align the ramp 122 to the pallet 110. In the illustrated embodiment, the registration receptacle 202 and locking receptacle 206 are embodied as a portion of an aperture 208 formed in an upper portion 210 of the bracket 140. A locking receptacle 206 may be embodied as a narrow portion 212 of the aperture 208 having a width 214. The registration receptacle 202 may be embodied as a wide portion 216 of the aperture 208 having a width 218 greater than the width 214 of the narrow portion 212.

The top portion 210 may be positioned a height 222 above the pallet 110 in order to permit insertion of a fastener and registration member through the aperture 208. Accordingly, in some embodiments, the top portion 210 may rest on two upwardly extending portions 224a and 224b.

A driving member 204 may be embodied as a portion of the bracket 140 positioned to urge the ramp 122 toward alignment, securement, or both, with the pallet 110 upon some movement of the ramp 122. For example, such movement may include pivoting or lowering the ramp 122 toward the bracket 140. In the illustrated embodiment, the driving member 204 is an angled portion 226 of the bracket 140. The angled portion 226 may begin angling upwardly in transverse direction 102a a distance 228 from the upwardly extending portion 224a. A securement portion 229 may extend between the upwardly extending portion 224a and the angled portion 226. The securement portion 229 may receive bolts, or like fasteners, for securing the bracket 140 to the pallet 110. The angled portion 226 may form an angle 230 of about 135 degrees relative to the securement portion 229.

A bracket 140 may have a width 232 corresponding to the width of the ramp 122 selected for use therewith. Accordingly, a bracket 140 may be wide for a wide ramp, and narrow for a narrower ramp. A bracket 140 may include a plurality of registration receptacles 202 and locking receptacles 204 likewise corresponding to the width of the ramp, with wider ramps having more receptacles 202, 204. Preferably, the receptacles 202 are distributed along the bracket 140 in lateral direction 102c and aligned with each other.

It will be noted that in some embodiments the portions of the pallet mounting bracket 140 performing distinct functions may be formed as distinct members, rather than as monolithic portions of the pallet mounting bracket 140. For example, the angled portion 226 and the top portion 210 having the aperture 208 formed therein may be separate members independently secured to the pallet 110.

Figure 3:
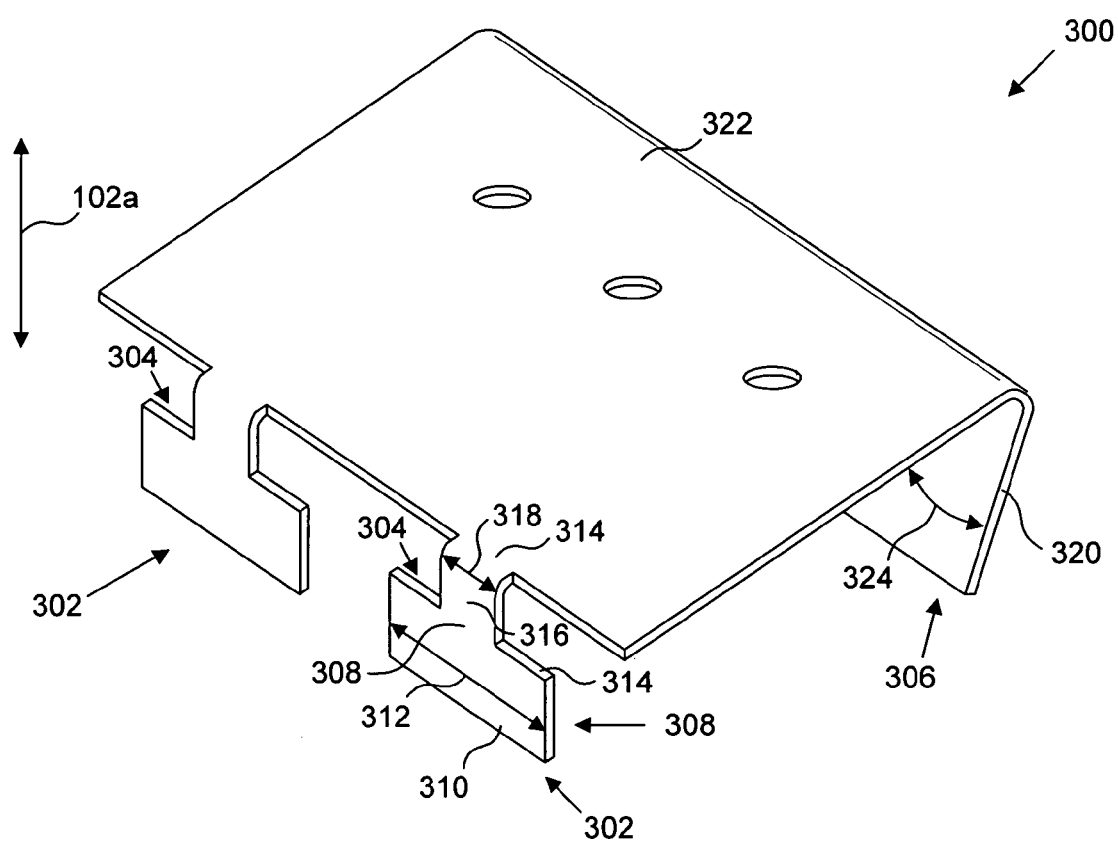
FIG. 3 is a perspective view of a ramp mounting bracket having a registration member, fastener, and engagement portion, in accordance with the present invention.

Referring to FIG. 3, ramp mounting bracket 300 may secure to the ramp 122 and engage the pallet mounting bracket 140 to secure and align the ramp 122 to the pallet 110. A ramp mounting bracket 300 may include a registration member 302 for both inserting into the registration receptacle 202 and a fastener 304 engaging the locking receptacle 206. A ramp mounting bracket 300 may likewise include an engagement portion 306 for engaging the driving member 204 of the pallet mounting bracket 140. A fastener 304 may be automatically engaged with the locking receptacle 206 or may be manually inserted by a user. For example, a fastener 304 may be a bolt that is manually inserted through apertures formed in the pallet mounting bracket 140 and ramp mounting bracket 300.

In the illustrated embodiment, the registration member 302 and fastener 304 are embodied as portions of a tab 308 secured to the ramp mounting bracket 300, or formed monolithically therewith. The tab 308 typically extends downwardly in transverse direction 102a. The registration member 302 may be embodied as a wide portion 310 having a width 312 slightly smaller than the width 218 (see FIG. 2) of the wide portion 216 of the aperture 208 formed in the pallet mounting bracket 140. A fastener 304 may be embodied as a cutout 314, or shoulder 314 formed in the tab 308, creating a narrow portion 316 on the tab 308 having a width 318 slightly smaller than the width 214 (see FIG. 2) of the narrow portion 212 of the aperture 208 formed in the pallet mounting bracket 140.

The engagement portion 306 may be embodied as an angled portion 320 connected or secured to the ramp mounting bracket 300 or formed monolithically therewith. The angled portion 320 may form an angle 324 of 45 degrees. The angled portion 320 and tab 308 may be secured to a securement portion 322. The securement portion 322 may secure directly to the ramp 122 by means of bolts, screws, or like fastener.

It will be noted that in some embodiments the portions of the ramp mounting bracket 300 performing distinct functions may be formed as distinct members, rather than as monolithic portions of the ramp mounting bracket 300. For example, the angled portion 320 and tab 308 may be separate members independently secured to the ramp 122.

Figure 4:
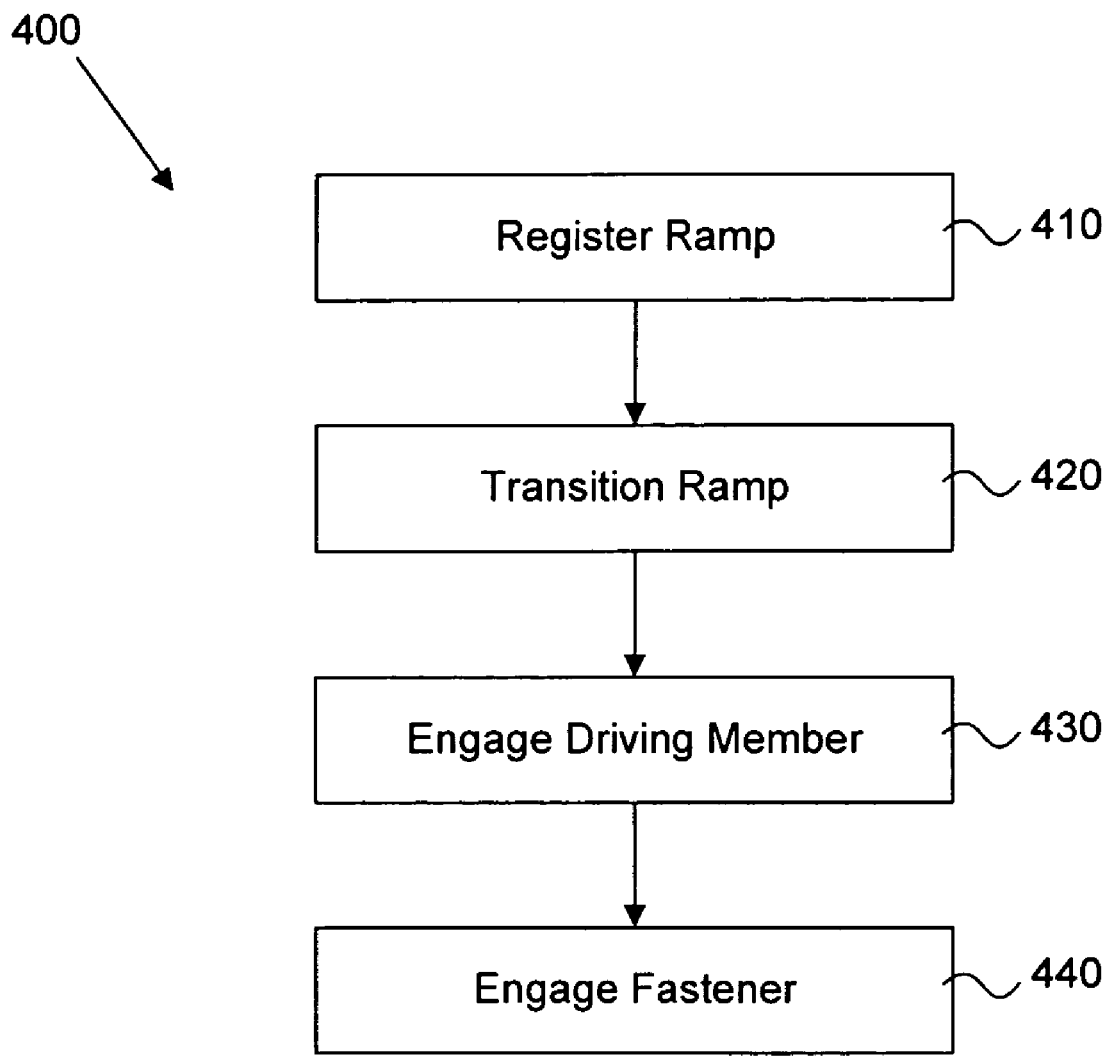
FIG. 4 is a process flow diagram of a method for securing a ramp to a pallet, in accordance to the present invention.

Referring to FIG. 4, a method 400 for securing a ramp 122 to a pallet 110 may include registering 410 the ramp 122, transitioning 420 the ramp 122, engaging 430 a driving member 204 with an engagement portion 306, and engaging 440 a fastener 304 with a locking receptacle 206. It will be noted that a method for removing a ramp 122 is simply the reverse of the actions described as part of the method 400.

Figure 5A:
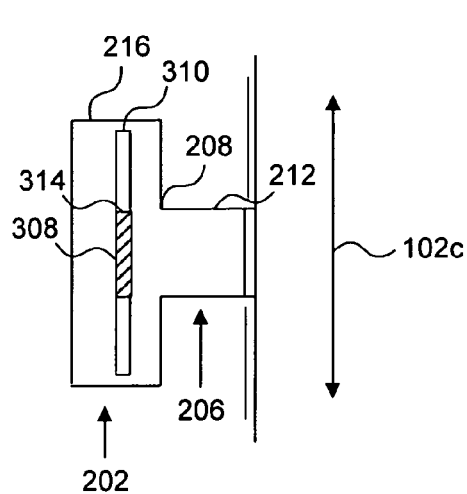
FIG. 5A is a top view of a pallet mounting bracket and ramp mounting bracket with the registration member inserted into the registration receptacle, in accordance with the present invention.
Figure 5B:
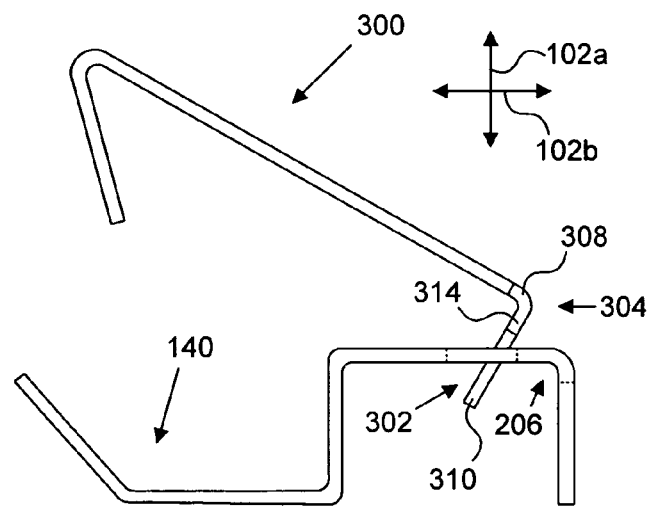
FIG. 5B is a side view of a registration member and registration receptacle, in accordance with the present invention.

Referring to FIGS. 5A and 5B, while still referring to FIG. 4, registering 410 the ramp 122 may include aligning the ramp 122 in at least one dimension with respect to the pallet 110 in order to position the engagement portion 306 sufficiently close to the driving member 204 to engage the driving member 204 in the transitioning step 420. Registering 410 may also position the fastener 304 in sufficient proximity to the locking receptacle 206 such that the driving member 204 urges the locking receptacle 206 into engagement with the fastener 304 during engagement 440 of the driving member 204 with the engagement portion 306.

In the illustrated embodiment, registering 410 the ramp 122 includes positioning the ramp in the lateral direction 102c and roughly positioning the ramp 122 in the longitudinal direction 102b. A user may be aided in registering 410 the ramp 122 by engaging the registration member 302 with the registration receptacle 202. In the illustrated embodiment of FIG. 5A, registering 410 therefore includes inserting the wide portion 310 of the tab 308 into the wide portion 216 of the aperture 208.

Figure 5C:
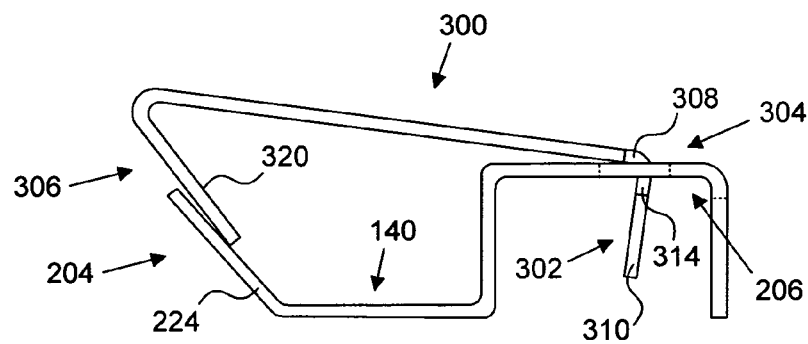
FIG. 5C is a side view of a pallet mounting bracket and ramp mounting bracket with the engagement portion engaged with the driving member of the pallet mounting bracket, in accordance with the present invention.

Referring to FIG. 5C, while still referring to FIG. 4, transitioning 420 the ramp 122 may include translating and/or rotating the ramp 122 substantially along a line of action or substantially about axis of rotation fixed in the registering step 410. In the illustrated embodiment, transitioning 420 the ramp 122 includes rotating the ramp 122 downwardly in rotational direction 104c about the point of contact between the ramp mounting bracket 300 and the pallet mounting bracket 140. In the illustrated embodiment, transitioning 420 the ramp 122 may also include translating the ramp 122 toward the pallet 110 in transverse direction 102a.

Engaging 430 the driving member 204 with the engagement portion 306 includes urging the engagement portion 204 against the driving member 306 to translate a force exerted on the ramp 122 in one direction into a force acting in another direction. For example, a rotational or downward force exerted on the ramp 122 in the transitioning step 420 may be translated into a longitudinal force in the engaging step 430.

In the illustrated embodiment of FIG. 5C, engaging 430 the driving member 204 with the engagement portion 306 includes urging the angled portion 320 of the ramp mounting bracket 300 against the angled portion 226 of the pallet mounting bracket 140, thereby causing a resulting force on the ramp mounting bracket 300 urging the ramp 122 in longitudinal direction 102b.

Figure 5D:
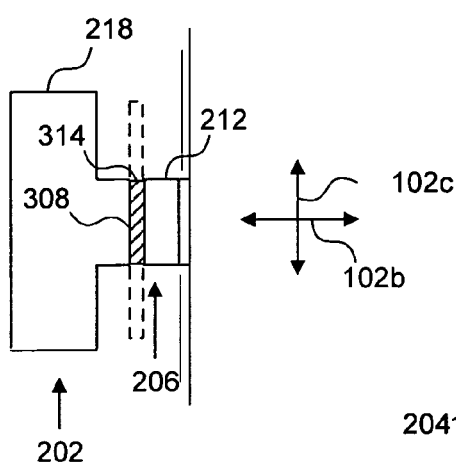
FIG. 5D is a top view of a pallet mounting bracket and ramp mounting bracket with the fastener engaged with the locking portion, in accordance with the present invention.
Figure 5E:
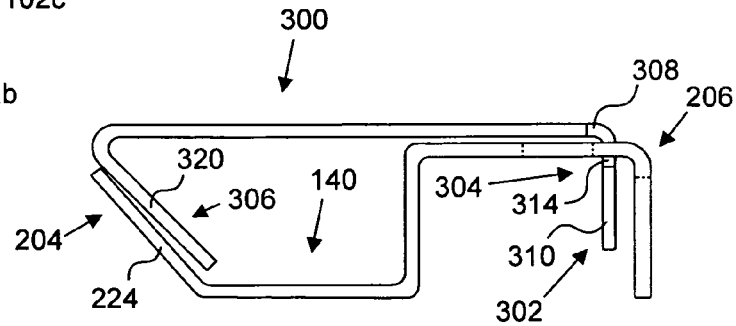
FIG. 5E is a side view of a fastener engaged with the locking portion, in accordance with the present invention.

Referring to FIGS. 5D and 5E, while still referring to FIG. 4, engaging the fastener 304 with the locking receptacle 206 may include engaging the narrow portion 316 of the tab 308 with the narrow portion 212 of the aperture 208. The shoulder 314, of the tab 308 will therefore prevent removal of the tab 308 from the aperture 208, unless the tab 308 is translated back in the longitudinal direction 102b.

Engaging fastener 304 with the locking portion 206 may be caused by the longitudinal motion forced by engagement of the engagement portion 306 with the driving member 204. It will be noted that the engagement of the driving member 204 with the engagement portion 306 prevents removal of the ramp 122 from the pallet 110 during unloading of cargo, inasmuch as the weight of the cargo will continuously press the engagement portion 306 against the driving member 204, in turn forcing the fastener 305 to remain inserted in the locking receptacle 206.

The longitudinal force caused by urging the engagement portion 306 against the driving member 204 also urges the edge 126 of the ramp 122 into transverse alignment with the channel 116 formed in the pallet 110. It will be noted that inasmuch as the pallet mounting bracket 140 is mounted on the upper surface 112a of the pallet 110 in some embodiments, a ramp 122 engaging the bracket 140 will be alignable in most cases regardless of any crushing or distortion of the pallet 110 beneath the upper surface 112a The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for aligning and securing a ramp to a surface, the apparatus comprising:

a first surface comprising a guide secured proximate an edge of the first surface and a receptacle;

a second surface having at least one operable position with respect to the first surface, the second surface comprising a follower configured to engage the guide as the second surface approaches the at least one operable position, the guide configured to drive the second surface further into the at least one operable position, wherein the guide comprises a first angled member secured to the first surface and the follower comprises a second angled member secured to the second surface, the second angled member positioned to be translatable downwardly against the first angled member to cause a resulting force effective to urge the second angled member longitudinally toward the first surface, the second surface further comprises a fastener, the fastener positioned to insert into the receptacle when the second surface is in the at least one operable position, the receptacle restraining the fastener against vertical movement when the fastener is inserted therein, wherein the fastener is a portion of a tab secured to the second surface and the receptacle is a locking portion of an aperture being defined by the first surface, the tab positioned to insert longitudinally into the locking portion.

2. The apparatus of claim 1, wherein the first surface comprises an upper surface of a pallet and the second surface comprises a portion of a ramp.

3. The apparatus of claim 1, further comprising a first mounting bracket fastened to the first surface, the first angled member being secured to the first mounting bracket and the aperture being defined by the first mounting bracket.

4. The apparatus of claim 3, further comprising a second mounting bracket secured to the second surface, the second angled member and tab being secured to the second mounting bracket.

5. The apparatus of claim 4, wherein the second mounting bracket is secured to the underside of the second surface.

6. The apparatus of claim 5, wherein the first surface comprises a recessed shelf proximate the edge thereof, the first mounting bracket secured to the recessed shelf.

7. The apparatus of claim 6, wherein the first surface comprises the upper surface of a pallet and the second surface comprises an inclined ramp surface.

8. An apparatus for aligning and securing a ramp to a pallet, the apparatus comprising:
 a pallet comprising
  an upper surface for supporting cargo,
  a lower surface for resting on a support surface spaced apart from the upper surface,
  a guide secured proximate an edge of the upper surface, the guide comprising a first angled member secured to the pallet and the follower comprises a second angled member secured to a ramp, the second angled member positioned to be translatable downwardly against the first angled member to cause a resulting force effective to urge the second angled member longitudinally toward the pallet;
  a receptacle;
 the ramp for unloading cargo from the pallet, the ramp comprising
  an inclined surface having a distal end positionable in alignment with the upper surface of the pallet and a proximal end spaced apart from the distal end and positionable in alignment with the support surface, the ramp having at least one operable position wherein the distal end is positioned in alignment with the upper surface;
  a follower configured to engage the guide as the ramp approaches the at least one operable position to drive the ramp further into the at least one operable position; and
  a fastener positioned to insert into the receptacle when the ramp is in the at least one operable position, the receptacle restraining the fastener against vertical movement when the fastener is inserted therein, wherein the fastener is a portion of a tab secured to the ramp and the receptacle is a locking portion of an aperture defined by the pallet, the tab positioned to insert longitudinally into the locking portion.

9. The apparatus of claim 8, further comprising a pallet mounting bracket fastened to the pallet, the first angled member being secured to the pallet mounting bracket and the aperture being defined by the bracket.

10. The apparatus of claim 9, further comprising a ramp mounting bracket secured to the ramp, the second angled member and tab being secured to the ramp mounting bracket.

* * * * *